US009122932B2

(12) United States Patent
Bala et al.

(10) Patent No.: US 9,122,932 B2
(45) Date of Patent: Sep. 1, 2015

(54) METHOD AND SYSTEM FOR AUTOMATICALLY DETECTING MULTI-OBJECT ANOMALIES UTILIZING JOINT SPARSE RECONSTRUCTION MODEL

(75) Inventors: Raja Bala, Pittsford, NY (US); Zhigang Fan, Webster, NY (US); Aaron Burry, Ontario, NY (US); Vishal Monga, State College, PA (US); Xuan Mo, State College, PA (US)

(73) Assignee: Xerox Corporation, Norwalk, CT (US)

( * ) Notice: Subject to any disclaimer, the term of this patent is extended or adjusted under 35 U.S.C. 154(b) by 600 days.

(21) Appl. No.: 13/476,239

(22) Filed: May 21, 2012

(65) Prior Publication Data
US 2013/0286208 A1      Oct. 31, 2013

Related U.S. Application Data

(60) Provisional application No. 61/640,189, filed on Apr. 30, 2012.

(51) Int. Cl.
| H04N 7/18 | (2006.01) |
| G06K 9/00 | (2006.01) |
| G08G 1/01 | (2006.01) |
| G06K 9/62 | (2006.01) |

(52) U.S. Cl.
CPC .......... *G06K 9/00771* (2013.01); *H04N 7/181* (2013.01); *G06K 9/6249* (2013.01); *G08G 1/0129* (2013.01)

(58) Field of Classification Search
None
See application file for complete search history.

(56) References Cited

U.S. PATENT DOCUMENTS 8,165,215 B2 *  4/2012  Aharon et al. ........... 375/240.22

OTHER PUBLICATIONS

Chen et al., Simultaneous Joint Sparsity Model for Target Detection in Hyperspectral Imagery; IEEE Geoscience and Remote Sensing Letters (vol. 8, Issue: 4); Jul. 2011; pp. 676-680 (Refrerred to as "Chen[1]").*
Chen et al., Hyperspectral Image Classification Using Dictionary-Based Sparse Representation; IEEE Transactions on Geoscience and Remote Sensing (vol. 49, Issue: 10); Oct. 2011; pp. 3973-3985 (Referred to as "Chen[2]").*

(Continued)

*Primary Examiner* — Christopher S Kelley
*Assistant Examiner* — Christopher Findley
(74) *Attorney, Agent, or Firm* — Kermit D. Lopez; Luis M. Ortiz; Ortiz & Lopez, PLLC

(57) ABSTRACT

Methods and systems for automatically detecting multi-object anomalies at a traffic intersection utilizing a joint sparse reconstruction model. A first input video sequence at a first traffic location can be received and at least one normal event involving P moving objects (where P is greater than or equal to 1) can be identified in an offline training phase. The normal event in the first input video sequence can be assigned to at least one normal event class and a training dictionary suitable for joint sparse reconstruction can be built in the offline training phase. A second input video sequence captured at a second traffic location similar to the first traffic location can be received and at least one event involving P moving objects can be identified in an online detection phase.

17 Claims, 7 Drawing Sheets

(56) References Cited

OTHER PUBLICATIONS

Fu, Z. et al., "Similarity Based Vehicle Trajectory Clustering and Anomaly Detection," IEEE International Conference on Image Processing (2005) (ICIP'05) 2:602-605.

Hu, W. et al., "A Survey on Visual Surveillance of Object Motion and Behaviors," IEEE Transactions on Systems, Man, and Cybernetics—Part C: Applications and Reviews (2004) 34(3):334-352.

Junejo, I. N. et al., "Multi Feature Path Modeling for Video Surveillance," Proc. IEEE Int. Conf. Pattern Recognition (2004) 2:716-719, Aug.

Li, C. et al. "Abnormal Behavior Detection via Sparse Reconstruction Analysis of Trajectory," Proc. IEEE 2011 Sixth International Conference on Image and Graphics, pp. 807-810.

Piciarelli, C. et al., "Trajectory—Based Anomalous Event Detection," IEEE Transactions on Circuits and Systems for Video Technology (2008) 18(11):1544-1554.

Saligrama, V. et al., "Video Anomaly Identification," IEEE Signal Processing Magazine (2010) 27(5):18-33.

Tropp, J. A. et al., "Algorithms for Simultaneous Sparse Approximation Part I: Greedy Pursuit," Elsevier Signal Process.—Special Issue on Sparse Approximations in Signal and Image Processing (2006) 86(3):572-588, Mar.

Wright, J. et al., "Robust Face Recognition via Sparse Representation," IEEE Transactions on Pattern Analysis and Machine Intelligence (2009) 31(2):210-227.

Yilmaz, A. et al., "Object Tracking: A Survey," ACM Computing Surveys (2006) 38(4):1-45, Article 13, December.

\* cited by examiner

METHOD AND SYSTEM FOR AUTOMATICALLY DETECTING MULTI-OBJECT ANOMALIES UTILIZING JOINT SPARSE RECONSTRUCTION MODEL

CROSS-REFERENCE TO PROVISIONAL APPLICATION

This patent application claims the benefit under 35 U.S.C. §119(e) of U.S. Provisional Application Ser. No. 61/640,189 entitled, "Method and System for Automatically Detecting Multi-Object Anomalies Utilizing Joint Sparse Reconstruction Model," which was filed on Apr. 30, 2012 and is incorporated herein by reference in its entirety.

TECHNICAL FIELD

Embodiments are generally related to data-processing methods, devices and systems, and the management of traffic systems. Embodiments are also related to video-based surveillance. Embodiments are additionally related to the detection of multi-object anomalies at traffic intersections for use in managing traffic.

BACKGROUND OF THE INVENTION

With the increased demand for security and safety, video-based surveillance systems are being utilized in a variety of rural and urban locations. A vast amount of video footage, for example, can be collected and analyzed for traffic violations, accidents, crime, terrorism, vandalism, and other suspicious activities. Because manual analysis of such large volumes of data is prohibitively costly, a pressing need exists for developing effective software tools that can aid in the automatic or semi-automatic interpretation and analysis of video data for surveillance, law enforcement, and traffic control and management.

Video-based anomaly detection refers to the problem of identifying patterns in data that do not conform to expected behavior and which may warrant special attention or action. The detection of anomalies in a transportation domain can include, for example, traffic violations, unsafe driver/pedestrian behavior, accidents, etc. FIGS. 1-2 illustrate pictorial views of exemplary transportation related anomalies captured from, for example, video monitoring cameras. In the scenario depicted in FIG. 1, unattended baggage 100 is shown and identified by a circle. In the scenario shown in FIG. 2, a vehicle is shown approaching a pedestrian 130. Both the vehicle and pedestrian 130 are shown marked by a circle.

Many common anomalies can arise from a single object. On the other hand, joint anomalies can also occur involving two or more objects. For example, in the area of transportation, accidents at traffic intersections are indeed based on joint and not just individual object behavior. Also, it is possible that the individual object behaviors are not anomalous when studied in isolation, but in combination produce an anomalous event. For example, a vehicle that comes to a stop at a pedestrian crossing before proceeding could be a result of the vehicle coming in very close proximity with a crossing pedestrian or another vehicle.

Several approaches have been proposed to detect traffic-related anomalies based on an object tracking technique. In one prior art approach, nominal vehicle paths can be derived and deviations thereof can be searched in a live traffic video data. The vehicle is tracked and its path is compared against nominal classes during a test or evaluation phase. A statistically significant deviation from all classes indicates an anomalous path. A problem associated with such an approach is that it is difficult to detect an abnormal pattern in realistic scenarios involving multiple object trajectories in the presence of occlusions, clutter, and other background noise.

Another prior art approach involves the use of a sparse reconstruction model for anomaly detection. For example, normal or usual events in a video footage can be extracted and categorized into a set of nominal event classes in a training step to form a training dictionary. The categorization is based on a set of n-dimensional feature vectors extracted from the video data and can be performed manually or automatically. Parametric representations of vehicle trajectories can be chosen as the feature vectors. The hypothesis underlying sparse reconstruction is that any test video sample representing a nominal event can be well explained by a sparse linear combination of samples within one of the nominal classes in the training dictionary. On the other hand, an anomalous event cannot be adequately reconstructed using a sparse linear combination of training dictionary samples. Thus, anomaly detection is accomplished by evaluating a sparsity measure, or equivalently, an outlier rejection measure of the reconstruction.

Specifically, let us take the case of single-object anomaly detection. The training samples from the i-th class can be arranged as columns of a matrix $A_i \in \mathbb{R}^{n \times T}$ wherein T is the number of training samples in a given class. A dictionary $A \in \mathbb{R}^{n \times KT}$ with respect to the training samples from all K classes can then be formed as follows: $A=[A_1, A_2, \ldots, A_K]$. A test image $y \in \mathbb{R}^n$ from the m-th class is conjectured to approximately lie in the linear span of those training samples belonging to the m-th trajectory class and may hence be represented by a sparse linear combination of the set of all training trajectory samples in that class, as shown below in equation (1):

$$y = A\alpha = [A_1, A_2, \ldots, A_K] \begin{bmatrix} \alpha_1 \\ \alpha_2 \\ \vdots \\ \alpha_K \end{bmatrix} \quad (1)$$

wherein each $\alpha_i \in \mathbb{R}^T$. Typically for a given trajectory y, only one of the $\alpha_i$'s is active (corresponding to the event class from which y is generated), thus the coefficient vector $\alpha \in \mathbb{R}^{KT}$ is modeled as being sparse and is recovered by solving the following optimization problem:

$$\hat{\alpha} = \underset{\alpha}{\operatorname{argmin}} \|\alpha\|_1 \text{ subject to } \|y - A\alpha\|_2 < \varepsilon \quad (2)$$

wherein the objective is to minimize the number of non-zero elements in $\alpha$. It is well known from the compressed sensing literature that utilizing the $l_0$ norm leads to an NP-hard (non-deterministic polynomial-time hard) problem. Thus, the $l_1$ norm can be employed as an effective approximation. A residual error between the test trajectory and each class behavior pattern can be computed as shown in equation (3) to determine a class to which the test trajectory belongs:

$$r_i(y) = \|y - A_i \hat{\alpha}_i\|_2 \; i=1, 2, \ldots, K \quad (3)$$

The test trajectory is assigned to that class with minimum residual error. If anomalies have been predefined into their own class, then the classification task also accomplishes anomaly detection. Alternatively, if all training classes correspond to nominal events, then anomalies can be identified via outlier detection. To this end, an outlier rejection measure can be defined and utilized to measure the sparsity of the reconstructed α:

$$SCI(\alpha) = \frac{K \cdot \max_i \|\delta_i(\alpha)\|_1 / \|\alpha\|_1 - 1}{K-1} \in [0, 1] \quad (4)$$

wherein $\delta_i(\alpha): \mathbb{R}^T \to \mathbb{R}^T$ is the characteristic function that selects the coefficients $\alpha_i$ with respect to the i-th class. The nominal samples are likely to exhibit a high measure, and conversely, anomalous samples will likely produce a low measure. A threshold on SCI(α) determines whether or not the sample is anomalous. Such a sparsity based framework for classification and anomaly detection is robust against various distortions, notably occlusion and is robust with respect to the particular features chosen, provided the sparse representation is computed correctly.

One notable shortcoming of the aforementioned formulation is that it may not detect joint anomalies involving multiple objects since it does not capture the interactions required to detect these types of multi-object anomalies.

Based on the foregoing, it is believed that a need exists for an improved system and method for automatically detecting multi-object anomalies at a traffic intersection, as will be described in greater detailed herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved traffic management methods and systems.

It is another aspect of the disclosed embodiments to provide for improved video-based surveillance methods and systems.

It is a further aspect of the disclosed embodiments to provide for improved methods and systems for automatically detecting multi-object anomalies at a traffic intersection for use in traffic control, management, and/or surveillance applications.

It is yet another aspect of the disclosed embodiments to provide for a joint sparse reconstruction model that will detect joint multi-object anomalies while retaining the advantages of being robust with respect to occlusion and choice of features.

The aforementioned aspects and other objectives and advantages can now be achieved as described herein. Methods and systems for automatically detecting multi-object anomalies at a traffic intersection utilizing a joint sparse reconstruction model are disclosed herein. A first input video sequence at a first traffic location can be received and at least one normal event involving P moving objects (where P is greater than 1) can be identified in an offline training phase. The normal event in the first input video sequence can be assigned to at least one normal event class and a training dictionary suitable for joint sparse reconstruction can be built in the offline training phase. A second input video sequence captured at a second traffic location similar to the first traffic location can be received and at least one event involving P moving objects can be identified in an online detection phase. An approximation of the event within the second input video sequence with respect to the over complete training dictionary can be reconstructed utilizing a joint sparse reconstruction model. An outlier rejection measure of approximation can be evaluated and the measure can be compared against a predetermined threshold to determine whether the event within the second input video sequence is anomalous.

A sample from a joint event involves a number of feature vectors (e.g., trajectories) and can be represented by a matrix. The event involving P moving objects can be defined as a collection of P trajectories corresponding to the moving objects where each trajectory is defined as a vector of n spatial coordinates of the object's path indexed by time. A training dictionary can be formed where each trajectory dictionary can be organized by concatenation of sub-dictionaries from all classes belonging to that particular trajectory. Class sub-dictionaries can have multiple trajectories associated with them. Training trajectories for a given class can be observed jointly from exemplary videos. A test video comprising P trajectories can be approximated as a linear combination of training samples in the training dictionary. A number of training dictionaries indexed by one or more properties such as date, time, and location can be constructed, and the most relevant training dictionary based on the properties can be retrieved in the online detection phase.

An optimization problem can be solved to determine a sparse coefficient matrix that best reconstructs the given test video. An auxiliary convex optimization problem can be formulated to solve this problem which minimizes Frobenius norm subject to a sparsity constraint, defined as a linear membership constraint. The auxiliary problem can be solved utilizing a simultaneous orthogonal matching pursuit algorithm. Once the sparse coefficient matrix is solved, the input sample can be classified by computing a class-specific residual error and the input sample can be assigned to the class that yields a minimum residual. A multi-object outlier rejection measure that takes joint interactions into account can be defined utilizing a characteristic function whose only non-zero entries are the rows in the sparse coefficient matrix that are associated with that class.

Alternatively, the anomalous event in the first video sequence involving P moving objects can be identified and assigned to an anomalous event class and the anomalous event class can be added to the training dictionary in the offline training phase. The event within the second input video sequence can be assigned to one of the event classes in the training dictionary by minimizing a reconstruction error in the online detection phase. The event within the second input video sequence is anomalous if the event is assigned to an anomalous event class. Such an approach detects and flags joint multi-object anomalies at a transportation site such as a traffic intersection, parking lot, or highway, and increases robustness with respect to effects such as noise and occlusion.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
FIGS. 1-2 illustrate an exemplary view of transportation related anomalies.
Figure 2:

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
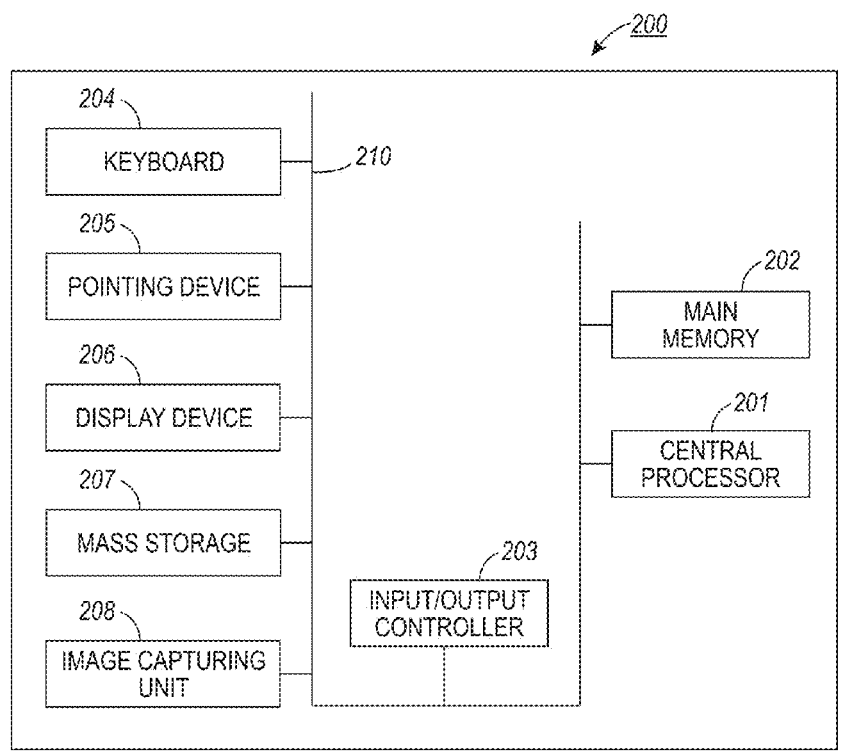
FIG. 3 illustrates a schematic view of a computer system, in accordance with the disclosed embodiments.
Figure 4:
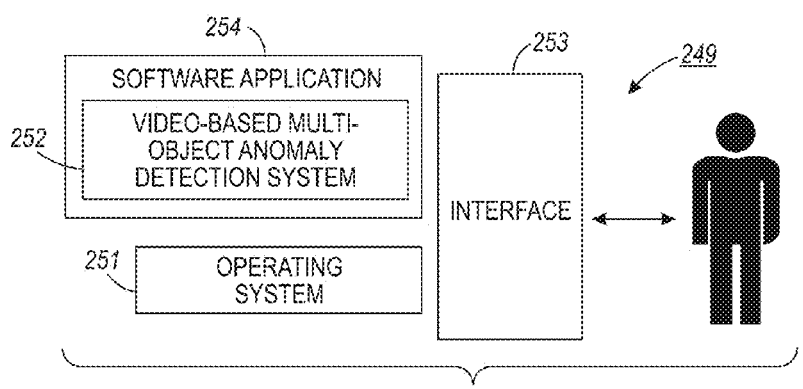
FIG. 4 illustrates a schematic view of a software system including a video-based multi-object anomaly detection module, an operating system, and a user interface, in accordance with the disclosed embodiments.

FIGS. 3-4 are provided as exemplary diagrams of data-processing environments in which embodiments of the present invention may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, the disclosed embodiments may be implemented in the context of a data-processing system 200 that can include, for example, a central processor 201, a main memory 202, an input/output controller 203, a keyboard 204, an input device 205 (e.g., a pointing device such as a mouse, track ball, and pen device, etc.), a display device 206, a mass storage 207 (e.g., a hard disk), an image-capturing unit 208, and, for example, a USB (Universal Serial Bus) peripheral connection or other types of electronic connections and components. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 4 illustrates a computer software system 250 for directing the operation of the data-processing system 200 depicted in FIG. 3. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; These inputs may be then acted upon by the data-processing system 200 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), also serves to display results, whereupon the user may supply additional inputs or terminate the session. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a video-based multi-object anomaly detection module 252 for automatically detecting multi-object anomalies at a traffic intersection for use in traffic control, management, and/or surveillance applications. Software application 254, on the other hand, can include instructions such as the various operations described herein with respect to the various components and modules described herein such as, for example, the methods 400 and 450 depicted in FIGS. 6-7.

FIGS. 3-4 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 5:
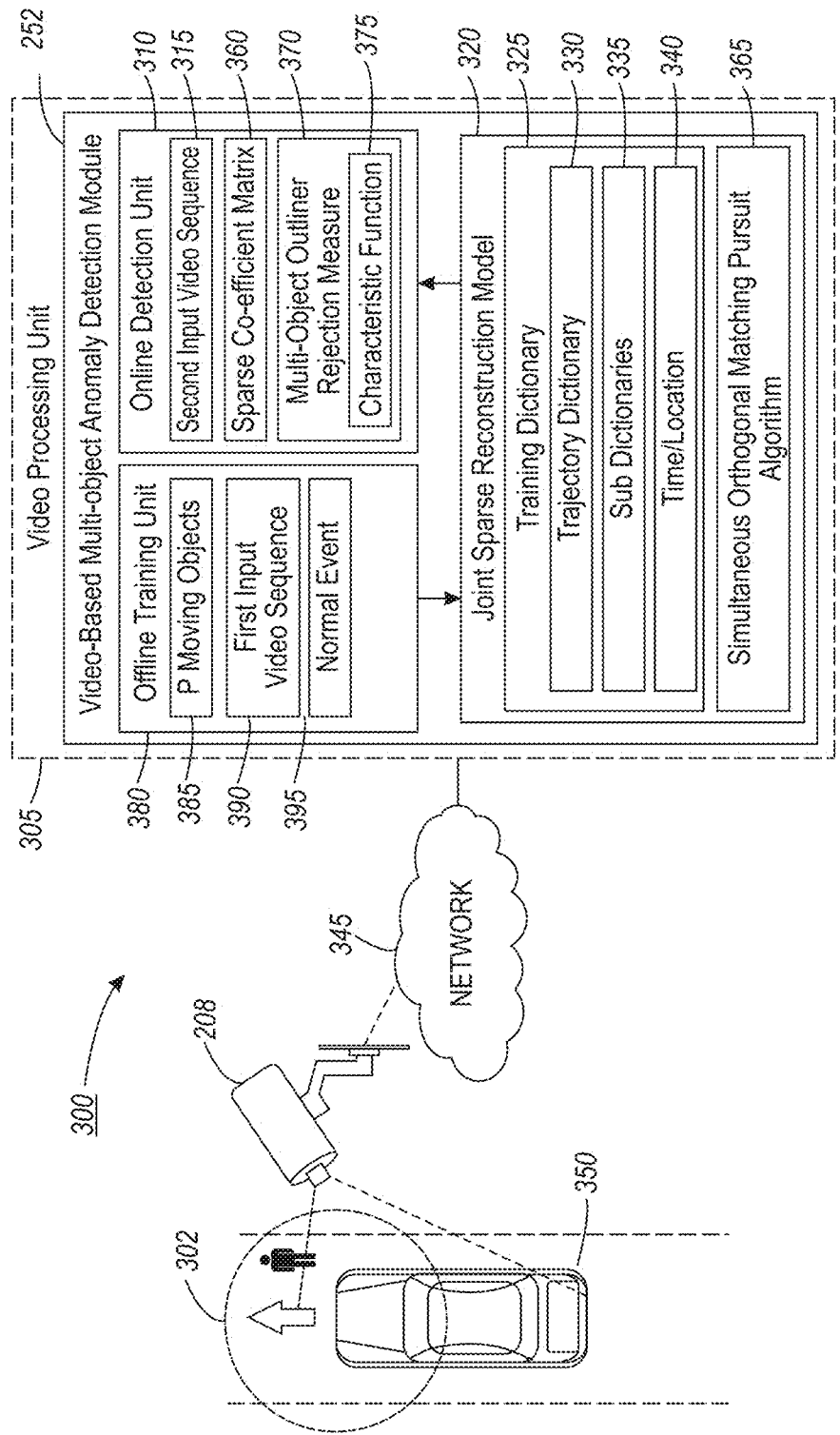
FIG. 5 illustrates a block diagram of a video-based multi-object anomaly detection system, in accordance with the disclosed embodiments.

FIG. 5 illustrates a block diagram of a video-based multi-object anomaly detection system 300, in accordance with the disclosed embodiments. Note that in FIGS. 3-9, identical or similar parts or elements are generally indicated by identical reference numeral. In general, the video-based multi-object anomaly detection system 300 depicted in FIG. 5 can be employed to detect collective anomalies or patterns 302 from video footage in order to identify unsafe driver/pedestrian behavior, accidents, traffic violations, suspicious activity, etc. The video-based multi-object anomaly detection system 300 can detect multi-object abnormal patterns 302 in scenarios where multiple vehicles, pedestrians, or other objects potentially move along complex trajectories, and in the presence of clutter, occlusion, and other background noise.

The video-based multi-object anomaly detection system 300 generally includes an image-capturing unit 208 (e.g., a digital camera, video camera, etc.) for capturing a vehicle 350 in motion within an effective field of view. The image-capturing unit 208 can be operatively connected to or communicate with a video-processing unit 305 via a network 345. Note that the image-capturing unit 208 described in greater detail herein is analogous or similar to the image-capturing unit 208 of the data-processing system 200, depicted in FIG. 3. The image-capturing unit 208 can include built-in integrated functions such as image-processing, data formatting, and data compression functions.

Note that the network 345 may employ any network topology, transmission medium, or network protocol. The network 345 may include connections such as wire, wireless communication links, or fiber optic cables. Network 345 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The video-processing unit 305 of the video-based multi-object anomaly detection system 300 can include a video-based multi-object anomaly detection module 252 for automatically detecting multi-object patterns or anomalies 302 at, for example, a traffic intersection or other traffic points. The video-based multi-object anomaly detection module 252 can further include an offline training unit 380 and an online detection unit 310. It can be appreciated that the offline training unit 380 and the online detection unit 310 can be implemented as software modules and/or hardware modules or components. In a preferred embodiment, however, units 380 and 310 can be implemented in the context of computer software.

Output from the offline training unit 380 is provided to a joint sparse reconstruction model 320, which in turn can provide data to the second video sequence 315. The joint sparse reconstruction model 320 can include a training dictionary 325, which in turn can include a trajectory dictionary 330, one or more sub-dictionaries 335, and time/location data 340. The online detection unit 310 can include a second input video sequence 315, and generates a sparse co-efficient matrix 360 and a multi-object outlier rejection measure 370. The offline training unit 380 receives a first input video sequence 390 at a first traffic location and identifies at least one normal event 395 involving P moving objects 385 (where P is greater than or equal to 1). The offline training unit 380 assigns the normal event 395 in the first input video sequence 390 to at least one normal event class and builds a training dictionary 325 suitable for joint sparse reconstruction. Each trajectory dictionary 330 within the training dictionary 325 can be organized by concatenation of sub-dictionaries 335 from all classes belonging to that given trajectory.

The training dictionary 325 can define normal (and therefore anomalous) events may depend on time (rush hour versus non-rush hour) and location/nature (e.g., see block 340) of the traffic site (e.g., traffic light intersection vs. highway vs. school crossing, etc.). A relevant dictionary can be invoked for anomaly detection in the given scenario.

The online detection unit 310 can receive the second input video sequence 315 captured at a second traffic location similar to the first traffic location and identifies the event involving P moving objects 385. The online detection unit 310 then reconstructs an approximation of the event within the second input video sequence 315 with respect to the training dictionary 325 utilizing the joint sparse reconstruction model 320. This reconstruction generates a sparse coefficient matrix 360. The online detection unit 310 evaluates an outlier rejection measure from the sparse coefficient matrix and compares the measure against a predetermined threshold to determine whether the event within the second input video sequence is anomalous.

Sparse reconstruction is accomplished by solving an optimization problem to determine a sparse coefficient matrix 360. In the preferred embodiment, a simultaneous orthogonal matching pursuit algorithm can be employed to solve an auxiliary convex optimization problem, which minimizes Frobenius norm subject to a sparsity constraint, defined as a linear membership constraint. The Frobenius norm is the matrix norm of an m×n matrix. In general, the simultaneous orthogonal matching pursuit can be employed for solving simultaneous sparse approximation problems. Matching pursuit is a type of numerical technique which involves finding the "best matching" projections of multidimensional data onto an dictionary.

A multi-object outlier rejection measure 370 that takes joint interactions into account can be defined utilizing a characteristic function for a given class whose only non-zero entries are the rows in the sparse coefficient matrix 360 that are associated with that class. The outlier rejection measure has the property that a relatively high value is produced for the case where the test video represents a nominal event and a relatively low value is produced for the case where the test video represents an anomalous event. Anomaly detection is therefore accomplished by comparing the outlier rejection measure with a predetermined threshold.

The joint sparse reconstruction model 320 detects joint anomalies 302 involving multiple objects in the presence of occlusions, clutter, and other background noise.

Figure 6:
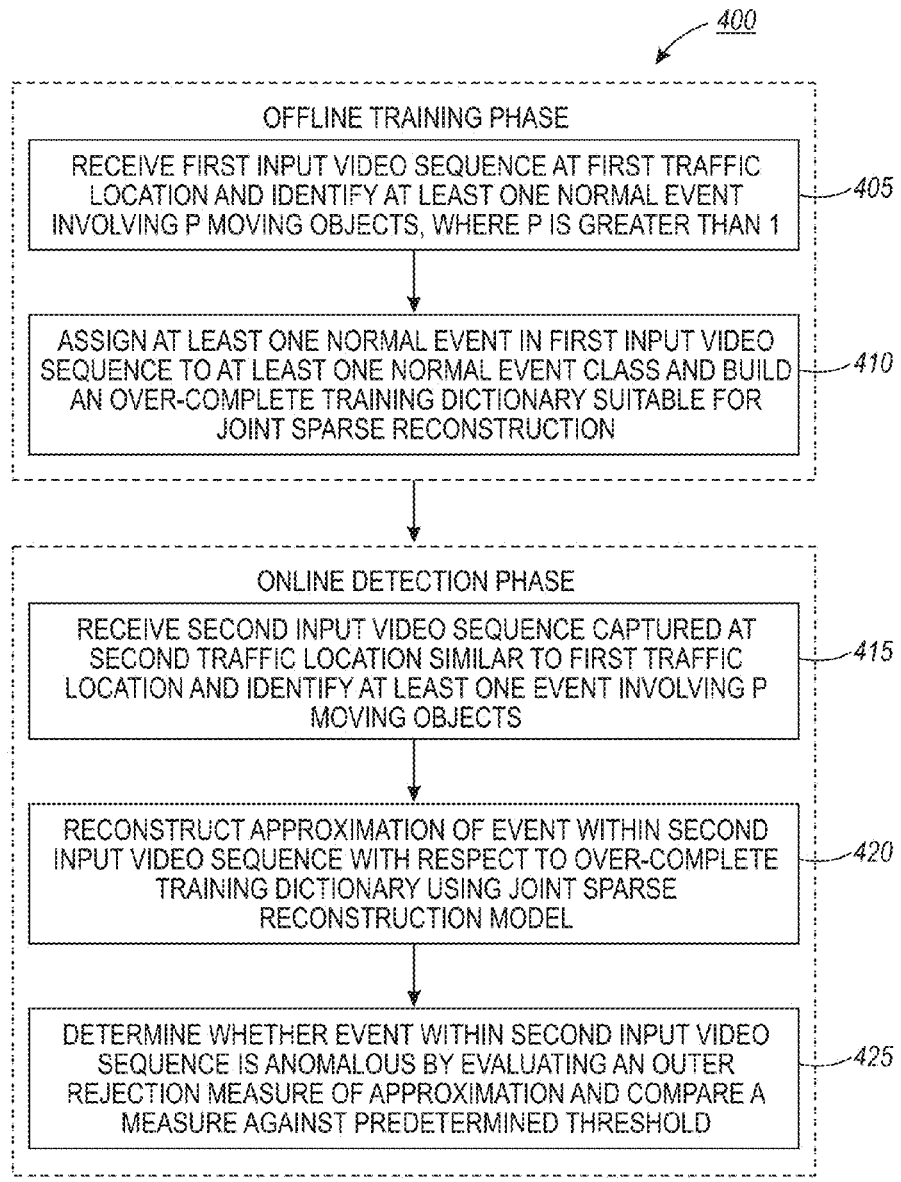
FIG. 6 illustrates a high level flow chart of operations illustrating logical operational steps of a method for automatically detecting multi-object anomalies at a traffic intersection utilizing a joint sparse reconstruction model, in accordance with the disclosed embodiments.

FIG. 6 illustrates a high level flow chart of operations illustrating logical operational steps of a method 400 for automatically detecting multi-object anomalies 302 at a traffic intersection for use in traffic control, management, and/or surveillance applications, in accordance with the disclosed embodiments. It can be appreciated that the logical operational steps shown in FIG. 6 can be implemented or provided via, for example, a module such as module 252 shown in FIG. 4 and can be processed via a processor such as, for example, the processor 201 shown in FIG. 3.

Initially, as indicated at block 405, the first input video sequence 390 at a first traffic location can be received and at least one normal event involving P moving objects (where P is greater than or equal to 1) can be identified in an offline training phase. The normal event in the first input video sequence 390 can be assigned to at least one normal event class and the training dictionary 325 suitable for joint sparse reconstruction can be built in the offline training phase, as shown at block 410. The second input video sequence 315 captured at a second traffic location similar to the first traffic location can be received and at least one event involving P moving objects can be identified in an online detection phase, as indicated at block 415.

Thereafter, as depicted at block 420, an approximation of the event within second input video sequence with respect to the over complete training dictionary 325 can be reconstructed utilizing the joint sparse reconstruction model 320 in the online detection phase. An outlier rejection measure of approximation can be evaluated and the measure can be compared against a predetermined threshold to determine whether the event within the second input video sequence is anomalous, as shown at block 425. For example, a sample from a joint event involves P feature vectors (e.g. trajectories) and can be represented by the matrix for detecting anomalies involving P objects:

$$Y=[y_1, y_2, \ldots, y_P] \in \mathbb{R}^{n \times P} \quad (5)$$

wherein $y_i$ corresponds to the i-th trajectory and is the length of the trajectory feature vector. The training dictionary can be represented by $A=[A_1, A_2, \ldots, A_P] \in \mathbb{R}^{n \times PKT}$ where each trajectory dictionary $A=[A_{i,1}, A_{i,2}, \ldots, A_{i,K}] \in \mathbb{R}^{n \times KT}$, i=1, 2, ..., P, is formed by the concatenation of the sub-dictionaries from all classes belonging to the i-th trajectory. Here K is the number of classes and T is the number of training trajectories in each class. The crucial aspect of this formulation is that the training trajectories for a given class j ($A_{i,j}$, i=1, 2, ..., P) can be observed jointly from example videos. The test P trajectories can now be represented as a linear combination of training samples as illustrated in equation (6):

$$Y=AS=[A_{1,1}, A_{1,2}, \ldots, A_{1,K}, \ldots, A_{i,1}, A_{i,2}, \ldots, A_{i,K}, \ldots, A_{P,1}, A_{P,2}, \ldots, A_{P,K}][\alpha_1, \ldots, \alpha_i, \ldots, \alpha_P] \quad (6)$$

where the coefficient vectors $\alpha_i$ lie in $\mathbb{R}^{PKT}$ and $S=[\alpha_1 \ldots \alpha_i \ldots \alpha_P]$. It is important to note that the i-th object trajectory of any observed set of test trajectories should only lie in the span of the training trajectories corresponding to the i-th object. Therefore, the columns of S can be represented as shown below in equation (7):

$$\alpha_1 = \begin{bmatrix} \alpha_{1,1} \\ \alpha_{1,2} \\ \vdots \\ \alpha_{1,K} \\ 0 \\ \vdots \\ 0 \end{bmatrix} \quad \alpha_i = \begin{bmatrix} 0 \\ \vdots \\ \alpha_{i,1} \\ \alpha_{i,2} \\ \vdots \\ \alpha_{i,K} \\ \vdots \\ 0 \end{bmatrix} \quad \alpha_P = \begin{bmatrix} 0 \\ \vdots \\ 0 \\ \alpha_{P,1} \\ \alpha_{P,2} \\ \vdots \\ \alpha_{P,K} \end{bmatrix} \quad (7)$$

where each of the sub-vectors $\{\alpha_{i,j}\}_{j=}^{K}$, i=1, 2, ..., P lies in $\mathbb{R}^T$, while 0 denotes a vector of all zeros in $\mathbb{R}^{KT}$. As a result, S exhibits a block-diagonal structure. For the single object case, it is known that a single nominal trajectory can be represented by a sparse linear combination of all the training samples in the corresponding nominal class. For multiple trajectories scenario, it is assumed that training samples with non-zero weights (in the sparse linear combination) exhibit one-one correspondence across different trajectories. In other words, if the i-th trajectory training sample from the j-th class is chosen for the i-th test trajectory, then it is necessary that the other P−1 trajectories must also choose from the j-th class with very high probability, albeit with possibly different weights.

For example, consider 2 objects and 2 training classes to explain the structure of Eq. (6). In this situation, P=2, K=2, so Eq. (6) can be written as shown below in equation (8):

$$Y = AS = [A_{1,1}, A_{1,2}, A_{2,1}, A_{2,2}] \begin{bmatrix} \alpha_{1,1} & 0 \\ \alpha_{1,2} & 0 \\ 0 & \alpha_{2,1} \\ 0 & \alpha_{2,2} \end{bmatrix} \quad (8)$$

The test sample can be considered as a collective event. Therefore, both trajectories in the sample can be classified into the same class. If the first trajectory is classified into the j-th class, the second trajectory must also be classified into j-th class, which means $\alpha_{1,j}$ and $\alpha_{2,j}$ must be activated simultaneously. The characteristic that certain coefficients must be activated jointly captures the interaction between objects. Analogous to the single object case an optimization problem can be solved to determine the sparsest S (by a suitable definition of sparsity) that solves equation (6). It is more convenient to define sparsity for a matrix S' defined as shown below in equation (9):

$$S' = \begin{bmatrix} \alpha_{1,1} & \alpha_{2,1} \\ \alpha_{1,2} & \alpha_{2,2} \end{bmatrix} \quad (9)$$

Note that S' extracts all non-zero vector elements from S in such a way that all jointly activated coefficients are moved into the same row so that the sparsity can be conveniently defined as the number of non-zero rows in S'. A general mapping from S to S' can be defined as follows:

$$S' = J(H \circ S) \quad (10)$$

wherein matrices H and J can be represented as shown below in equation (11):

$$H = \begin{bmatrix} 1 & 0 & \cdots & 0 \\ 0 & 1 & \cdots & 0 \\ \vdots & \vdots & \vdots & \vdots \\ 0 & 0 & \cdots & 1 \end{bmatrix} \quad (11)$$

$$J = [I_{KT}, I_{KT}, \ldots, I_{KT}]$$

wherein the operator ○ indicates the entry-wise matrix Hadamard product. The vectors 1 and 0 in H are in $R^{KT}$, and contain all ones and zeros respectively, and the elements $I_{KT}$ in J are the KT-dimensional identity matrix. Finally, the optimization problem to be solved for the joint sparsity model can be given by equation (12):

$$\text{minimize} = \|J(H \circ S)\|_{row,0} \quad (12)$$
$$\text{subject to } \|Y - AS\|_F < \varepsilon$$

wherein $\|\cdot\|_{row,0}$ is the row norm indicating the number of non-zero rows in the matrix, and $\|\cdot\|_F$ indicates Frobenius norm. Thus the optimization seeks the sparsest joint parameter set S' (i.e., with the minimum number of non-zero rows) that accurately explains the test sample in terms of training events. Note that when P=1, equation (12) reduces to the single-object sparse reconstruction problem given by equation (2).

The solution to equation (12) is non-trivial since the objective function is not convex. One approach is to solve an auxiliary convex optimization problem, which minimizes the Frobenius norm $\|Y−AS\|_F$ subject to the sparsity constraint, defined as a linear membership constraint. In the preferred embodiment, a modified version of the simultaneous orthogonal matching pursuit algorithm is employed. Once the sparse coefficient matrix S has been solved, the same procedure can be followed to classify the input sample Y by computing class-specific residual errors and assigning Y to the class that yields the minimum residual:

$$\text{identity}(Y) = \underset{i}{\text{argmin}} \|Y - A\delta_i(S)\|_F \quad (13)$$

wherein $\delta_i(S)$ is the matrix whose only nonzero entries are the same as those in S associated with class i (in all P trajectories). As is the case with single objects, if anomalous events have not been predefined as a separate class, then anomaly detection can be achieved by identifying outliers with the use of a multi-object outlier rejection measure. One technique for extending the single-object outlier rejection measure involves computing equation (4) with respect to each of the P objects, and returning the minimum of these indices as the multi-object outlier rejection measure. This is a conservative approach that argues that a multi-object anomaly is governed by the single-object behavior that is the most deviant from normal. If the anomaly resides purely in the interaction amongst objects rather than in their isolated behaviors a better outlier rejection measure that takes joint interactions into account can be defined as follows. Let $\lambda_i(S')$ represent a characteristic function whose only non-zero entries are the rows in S' that are associated with the i-th class. Now the multi-object outlier rejection measure can be defined as shown below in equation (14):

$$JSCI(S') = \frac{K \cdot \max_i \|\lambda_i(S')\|_{row,0} / \|S'\|_{row,0} - 1}{K - 1} \quad (14)$$

where again the row norm $\|\ \|_{row,0}$ represents the number of non-zero rows of a matrix. Note that this is a natural and elegant extension of Eq. (4) to multiple objects.

It is to be understood that the training dictionary that defines normal (and therefore anomalous) events may depend on time (rush hour versus non-rush hour) and location/nature of the traffic site (traffic light intersection vs. highway vs. school crossing, etc.).

Figure 7:
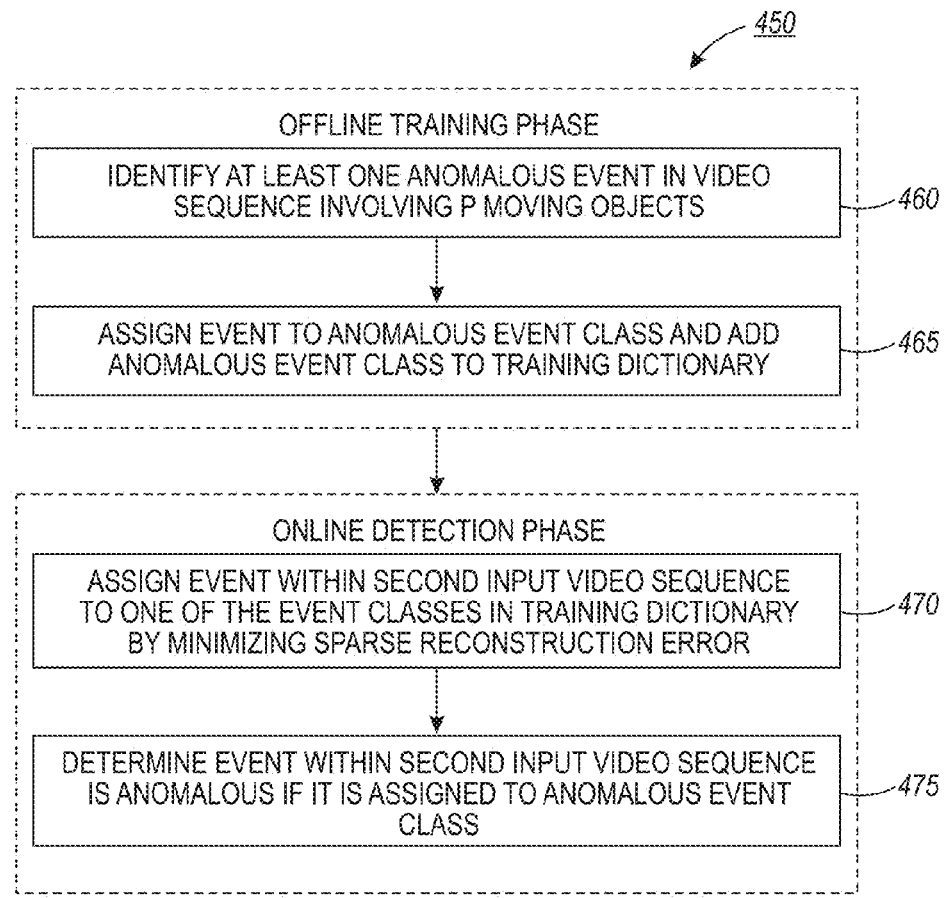
FIG. 7 illustrates a high level flow chart of operations illustrating logical operational steps of a method for automatically detecting multi-object anomalies, in accordance with the disclosed embodiments.

FIG. 7 illustrates a high-level flowchart of operations illustrating logical operational steps of a method 450 for automatically detecting the multi-object anomalies 302, in accordance with the disclosed embodiments. The anomalous event in the first video sequence involving P moving objects can be identified, as indicated at block 460. The event can be assigned to the anomalous event class and the anomalous event class can be added to the training dictionary in the offline training phase, as shown at block 465. The event within the second input video sequence can be assigned to one of the event classes in the training dictionary by minimizing the residual error of sparse reconstruction in the online detection phase, as shown at block 470. The event within second input video sequence is anomalous if the event is assigned to an anomalous event class, as depicted at block 475.

Figure 8:
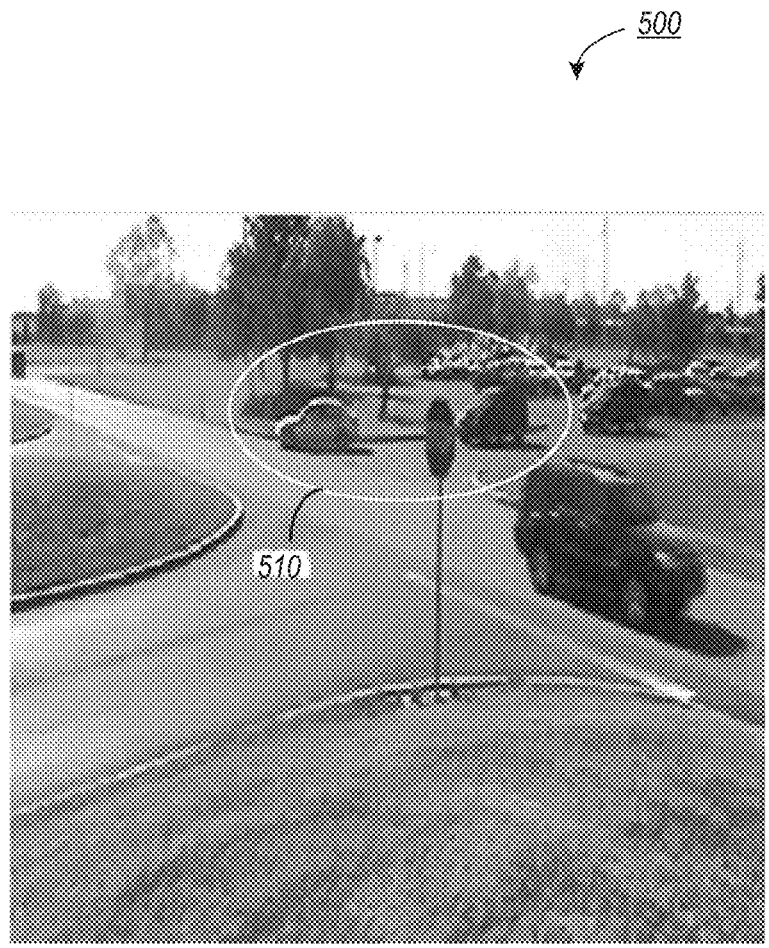
FIGS. 8-9 illustrate a processed video image with multi-object anomalies, in accordance with the disclosed embodiments.
Figure 9:
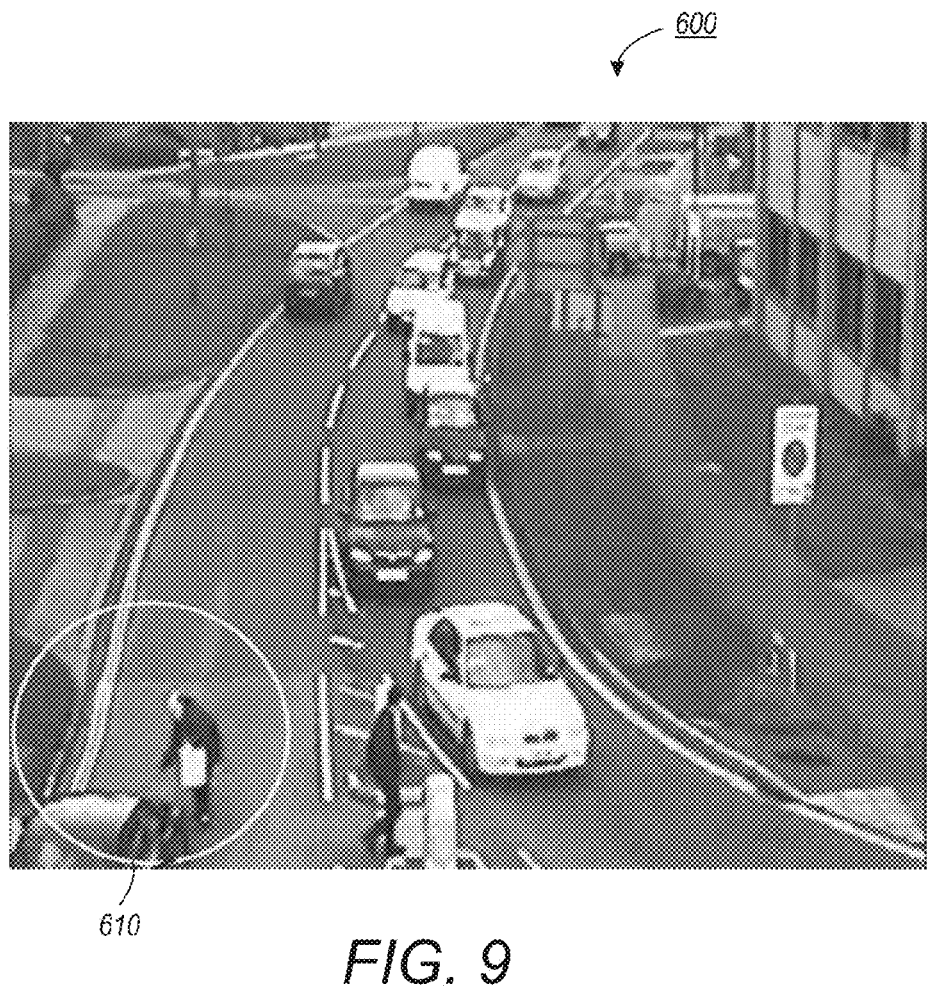

FIGS. 8-9 illustrate a processed video image 500 and 600 depicting multi-object anomalies 510 and 610, in accordance with the disclosed embodiments. The video image 500 is acquired at a stop sign intersection which includes the joint anomaly 510, for example, a sequence of cars leaving a parking lot and approaching a stop sign before entering a main road. The second and third vehicles come to a complete stop when waiting for the vehicle in front of them, but do not actually stop at the stop sign. The multi-object anomaly can be implemented for the case of P=2 objects to successfully flag the joint anomaly 510.

The video footage 600 is acquired at a busy street which includes joint anomaly 610, for example, a pedestrian crossing the street loses his hat and retraces his footsteps to pick it up from the road. At this time, a vehicle comes in very close proximity to the pedestrian and comes to a sudden halt. This is an example of a joint 2-object anomaly that is again successfully detected by the joint sparsity-based reconstruction model 320. The video-based multi-object anomaly detection system 300 detects and flags joint multi-object anomalies at a transportation site such as a traffic intersection, parking lot, or highway and increases robustness with respect to effects such as noise and occlusion.

Based on the foregoing, it can be appreciated that a number of embodiments, preferred and alternative, are disclosed herein. For example, in one embodiment, a method can be implemented for detecting multi-object anomalies in transportation related video footage. Such a method can include, for example, receiving in an offline training phase a first input video sequence at a first traffic location and identifying at least one normal event involving P moving objects, where P is greater than 1; assigning in the offline training phase the at least one normal event in the first input video sequence to at least one normal event class and building a training dictionary suitable for joint sparse reconstruction; receiving in an online detection phase a second input video sequence captured at a second traffic location similar to the first traffic location and identifying at least one event involving P moving objects; and reconstructing in the online detection phase an approximation of the event within second input video sequence with respect to the training dictionary using a joint sparse reconstruction model.

In another embodiment, a step can be implemented for determining in the online detection phase whether the event within second input video sequence is anomalous by evaluating an outlier rejection measure of the approximation and comparing the measure against a predetermined threshold. In still another embodiment, the aforementioned value of P can be, for example, 2. In yet other embodiments, an event involving the P moving objects can be defined as a collection of P trajectories corresponding to the moving objects, wherein each trajectory is defined as a vector of n spatial coordinates of the object's path indexed by time.

In yet another embodiment, the aforementioned training dictionary can be defined as $A=[A_1, A_2, \ldots, A_P]$ where $A_i=[A_{i,1}, A_{i,2}, \ldots, A_{i,K}] \in \mathbb{R}^{n \times KT}$, $i=1, 2, \ldots, P$ represents concatenation of sub-dictionaries from all classes belonging to an i-th trajectory, K represents a number of normal event classes, and T represents a number of events per class. In another embodiment, the joint sparse reconstruction model can be given by: $Y=AS=[A_{1,1}, A_{1,2}, \ldots, A_{1,K}, \ldots, A_{i,1}, A_{i,2}, \ldots, A_{i,K}, \ldots, A_{p,1}, A_{p,2}, \ldots, A_{p,K}][\alpha_1, \ldots, \alpha_i, \ldots, \alpha_p]$ wherein Y represents a P-object event in the second video input sequence, A represents the training dictionary, and S represents a sparse matrix of coefficient weights determined by solving an optimization problem.

In another embodiment, the optimization problem can be given by $$\text{minimize} = \|J(H \circ S)\|_{row,0}$$
$$\text{subject to } \|Y - AS\|_F < \varepsilon$$

wherein $\|\bullet\|_{row,0}$ represents a row norm indicating a number of non-zero rows in the matrix, and $\|\bullet\|_F$ indicates the Frobenius norm. Here $$H = \begin{bmatrix} 1 & 0 & \ldots & 0 \\ 0 & 1 & \ldots & 0 \\ \vdots & \vdots & \vdots & \vdots \\ 0 & 0 & \ldots & 1 \end{bmatrix},$$

$J=[I_{KT}, I_{KT}, \ldots, I_{KT}]$ where operator $\circ$ indicates an entry-wise matrix Hadamard product. The vectors 1 and 0 in H are in $\mathbb{R}^{KT}$ and contain all ones and zeros respectively, and the elements $I_{KT}$ in J are the KT-dimensional identity matrix.

In another embodiment, the optimization problem can be solved by formulating an auxiliary convex optimization problem which minimizes Frobenius norm $\|Y-AS\|^F$ subject to a sparsity constraint defined as a linear membership constraint utilizing a simultaneous orthogonal matching pursuit algorithm. In still another embodiment, the outlier rejection measure can be given by $$JSCI(S') = \frac{K \cdot \max_i \|\lambda_i(S')\|_{row,0} / \|S'\|_{row,0} - 1}{K-1}$$

where the row norm represents the number of non-zero rows of the matrix.

In yet another embodiment, an operation or step can be provided for constructing a plurality of training dictionaries indexed by one or more properties such as date, time, location, and retrieving in the online detection phase a most relevant training dictionary based on the properties.

In other embodiments, operations or steps can be provided for identifying in the offline training phase at least one anomalous event in the first video sequence involving P moving objects, assigning the event to an anomalous event class and adding the anomalous event class to the training dictionary; assigning in the online detection phase the event within second input video sequence to one of the event classes in the training dictionary by minimizing a reconstruction error; and determining in the online detection phase that the event within second input video sequence is anomalous if it is assigned to an anomalous event class.

In another embodiment, the assignment in the online detection phase of the event within second input video sequence to one of the event classes in the training dictionary is be given by identity $$(Y) = \underset{i}{\text{argmin}} \|Y - A\delta_i(S)\|_F$$

wherein $\delta_i(S)$ represents the matrix whose only nonzero entries are similar as those in S associated with class i, and $\|\;\|_F$ is the Frobenius norm.

In yet another embodiment, a system can be provided for detecting multi-object anomalies in transportation related video footage. Such a system can include a processor; a data bus coupled to the processor; and a computer-usable medium embodying computer program code, the computer-usable medium being coupled to the data bus. The computer program code can include instructions executable by the processor and configured for, for example: receiving in an offline training phase a first input video sequence at a first traffic location and identifying at least one normal event involving P moving objects, where P is greater than 1; assigning in the offline training phase the at least one normal event in the first input video sequence to at least one normal event class and building a training dictionary suitable for joint sparse reconstruction; receiving in an online detection phase a second input video sequence captured at a second traffic location similar to the first traffic location and identifying at least one event involving P moving objects; and reconstructing in the online detection phase an approximation of the event within second input video sequence with respect to the training dictionary using a joint sparse reconstruction model.

In another embodiment, such instructions can be further configured for determining in the online detection phase whether the event within second input video sequence is anomalous by evaluating an outlier rejection measure of the approximation and comparing the measure against a predetermined threshold. In some system embodiments, P can be 2. In still other system embodiments, an event involving the P moving objects can be defined as a collection of P trajectories corresponding to the moving objects, wherein each trajectory is defined as a vector of n spatial coordinates of the object's path indexed by time.

In some system embodiments, the training dictionary can be defined as $A=[A_1, A_2, \ldots, A_p]$ where $A_i=[A_{i,1}, A_{i,2}, \ldots, A_{i,K}] \in \mathbb{R}^{n \times KT}$, $i=1, 2, \ldots, P$ represents concatenation of sub-dictionaries from all classes belonging to an i-th trajectory, K represents a number of normal event classes, and T represents a number of events per class. In other system embodiments, the joint sparse reconstruction model can be given by: $Y=AS=[A_{1,1}, A_{1,2}, \ldots, A_{1,K}, \ldots, A_{i,1}, A_{i,2}, \ldots, A_{i,K}, \ldots, A_{p,1}, A_{p,2}, \ldots, A_{p,K}][\alpha_1, \ldots, \alpha_i, \ldots, \alpha_p]$ wherein Y represents a P-object event in the second video input sequence, A represents the training dictionary, and S represents a sparse matrix of coefficient weights determined by solving an optimization problem.

In still another embodiment, a processor-readable medium storing code representing instructions to cause a process for detecting multi-object anomalies in transportation related video footage can be implemented. Such code can, for example, include code to: receive in an offline training phase a first input video sequence at a first traffic location and identifying at least one normal event involving P moving objects, where P is greater than 1; assign in the offline training phase the at least one normal event in the first input video sequence to at least one normal event class and building a training dictionary suitable for joint sparse reconstruction; receive in an online detection phase a second input video sequence captured at a second traffic location similar to the first traffic location and identifying at least one event involving P moving objects; and reconstruct in the online detection phase an approximation of the event within second input video sequence with respect to the training dictionary using a joint sparse reconstruction model. In some embodiments, such code can further comprise code to determine in the online detection phase whether the event within second input video sequence is anomalous by evaluating an outlier rejection measure of the approximation and comparing the measure against a predetermined threshold.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for detecting multi-object anomalies in transportation related video footage, said method comprising:
   receiving in an offline training phase a first input video sequence at a first traffic location and identifying at least one normal event involving P moving objects, where P is greater than 1;
   assigning in said offline training phase said at least one normal event in said first input video sequence to at least one normal event class and building a training dictionary suitable for joint sparse reconstruction;
   receiving in an online detection phase a second input video sequence captured at a second traffic location similar to said first traffic location and identifying at least one event involving P moving objects;
   reconstructing in said online detection phase an approximation of said event within second input video sequence with respect to said training dictionary using a joint sparse reconstruction model; and
   determining in said online detection phase whether said event within second input video sequence is anomalous by evaluating an outlier rejection measure of said approximation and comparing said measure against a predetermined threshold, wherein said outlier rejection measure is given by $$JSCI(S') = \frac{K \cdot \max_i \|\lambda_i(S')\|_{row,0} / \|S'\|_{row,0} - 1}{K-1},$$

where $$S' = \begin{bmatrix} \alpha_{1,1} & \alpha_{2,1} \\ \alpha_{1,2} & \alpha_{2,2} \end{bmatrix}$$

and $\alpha_{i,j}$ are coefficient sub-vectors corresponding to coefficient vectors $\alpha_i$, where $i=1, 2, \ldots, P$ represents concatenation of sub-dictionaries from all classes belonging to an i-th trajectory and j represents a given class, K represents a number of normal event classes, $\lambda_i(S')$ represents a characteristic function whose only non-zero entries are the rows in S' that are associated with the i-th class, and row norm $\| \|_{row,0}$ represents the number of non-zero rows of a matrix.

2. The method of claim 1 wherein P is 2.

3. The method of claim 1, wherein an event involving said P moving objects is defined as a collection of P trajectories corresponding to said moving objects, wherein each trajectory is defined as a vector of n spatial coordinates of the object's path indexed by time.

4. The method of claim 3 where said training dictionary is defined as $A=[A_1, A_2, \ldots, A_p]$ where $A_i=[A_{i,1}, A_{i,2}, \ldots, A_{i,K}] \in \mathbb{R}^{n \times KT}$, $i=1, 2, \ldots, P$ represents concatenation of sub-dictionaries from all classes belonging to an i-th trajectory, K represents a number of normal event classes, and T represents a number of events per class.

5. The method of claim 4 wherein said joint sparse reconstruction model is given by: $Y=AS=[A_{1,1}, A_{1,2}, \ldots, A_{1,K}, \ldots, A_{i,1}, A_{i,2}, \ldots, A_{i,K}, \ldots, A_{p,1}, A_{p,2}, \ldots, A_{p,K}]$

[$a_1, \ldots, a_i, \ldots, a_p$]Y=AS wherein Y represents a P-object event in the second video input sequence, A represent said training dictionary, and S represent a sparse matrix of coefficient weights determined by solving an optimization problem.

6. The method of claim 5 wherein said optimization problem is given by $$\text{minimize} = \|J(H \circ S)\|_{row,0}$$

$$\text{subject to} \|Y - AS\|_F < \varepsilon$$

where $$H = \begin{bmatrix} 1 & 0 & \ldots & 0 \\ 0 & 1 & \ldots & 0 \\ \vdots & \vdots & \vdots & \vdots \\ 0 & 0 & \ldots & 1 \end{bmatrix},$$

$$J = [I_{KT}, I_{KT}, \ldots, I_{KT}],$$

where operator $\circ$ indicates an entry-wise matrix Hadamard product, the vectors 1 and 0 in H are in $R^{KT}$, and contain all ones and zeros respectively, the elements $I_{KT}$ in J are the KT-dimensional identity matrix, $\| \: \|_{row,0}$ represents a row norm indicating the number of non-zero rows in said matrix, and $\| \: \|_F$ indicates said Frobenius norm.

7. The method of claim 6 wherein said optimization problem is solved by formulating an auxiliary convex optimization problem which minimizes Frobenius norm $\|Y-AS\|_F$ subject to a sparsity constraint defined as a linear membership constraint utilizing a simultaneous orthogonal matching pursuit algorithm.

8. The method of claim 1 further comprising constructing a plurality of training dictionaries indexed by one or more properties such as date, time, location, and retrieving in said online detection phase a most relevant training dictionary based on said properties.

9. The method of claim 1 further comprising:
identifying in said offline training phase at least one anomalous event in said first video sequence involving P moving objects, assigning said event to an anomalous event class, and adding said anomalous event class to said training dictionary;
assigning in said online detection phase said event within second input video sequence to one of the event classes in said training dictionary by minimizing a reconstruction error; and
determining in said online detection phase that said event within second input video sequence is anomalous if it is assigned to an anomalous event class.

10. The method of claim 9 wherein said assignment in online detection phase is given by identity $$(Y) = \underset{i}{\text{argmin}} \|Y - A\delta_i(S)\|_F$$

wherein $\delta_i(S)$ represents said matrix whose only nonzero entries are similar as those in S associated with class I and $\| \: \|_F$ is the Frobenius norm.

11. A system for detecting multi-object anomalies in transportation related video footage, said system comprising:
a processor;
a data bus coupled to said processor; and
a computer-usable medium embodying computer program code, said computer-usable medium being coupled to said data bus, said computer program code comprising instructions executable by said processor and configured for:
receiving in an offline training phase a first input video sequence at a first traffic location and identifying at least one normal event involving P moving objects, where P is greater than 1;
assigning in said offline training phase said at least one normal event in said first input video sequence to at least one normal event class and building a training dictionary suitable for joint sparse reconstruction;
receiving in an online detection phase a second input video sequence captured at a second traffic location similar to said first traffic location and identifying at least one event involving P moving objects;
reconstructing in said online detection phase an approximation of said event within second input video sequence with respect to said training dictionary using a joint sparse reconstruction model; and
determining in said online detection phase whether said event within second input video sequence is anomalous by evaluating an outlier rejection measure of said approximation and comparing said measure against a predetermined threshold, wherein said outlier rejection measure is given by $$JSCI(S') = \frac{K \cdot \max_i \|\lambda_i(S')\|_{row,0} / \|S'\|_{row,0} - 1}{K - 1},$$

where $$S' = \begin{bmatrix} \alpha_{1,1} & \alpha_{2,1} \\ \alpha_{1,2} & \alpha_{2,2} \end{bmatrix}$$

and $\alpha_{i,j}$ are coefficient sub-vectors corresponding to coefficient vectors $\alpha_i$, where i=1, 2, ..., P represents concatenation of sub-dictionaries from all classes belonging to an i-th trajectory and j represents a given class, K represents a number of normal event classes, $\lambda_i(S')$ represents a characteristic function whose only non-zero entries are the rows in S' that are associated with the i-th class, and row norm $\| \: \|_{row,0}$ represents the number of non-zero rows of a matrix.

12. The system of claim 11 wherein P is 2.

13. The system of claim 11 wherein an event involving said P moving objects is defined as a collection of P trajectories corresponding to said moving objects, wherein each trajectory is defined as a vector of n spatial coordinates of the object's path indexed by time.

14. The system of claim 11 where said training dictionary is defined as $A=[A_1, A_2, \ldots, A_P]$ where $A_i=[A_{i,1}, A_{i,2}, \ldots A_{i,K}] \in \mathbb{R}^{n \times KT}$, i=1, 2, ..., P represents concatenation of sub-dictionaries from all classes belonging to an i-th trajectory, K represents a number of normal event classes, and T represents a number of events per class.

15. The system of claim 14 wherein said joint sparse reconstruction model is given by Y=AS=[$A_{1,1}, A_{1,2}, \ldots, A_{1,K}, \ldots, A_{i,1}, A_{i,2}, \ldots, A_{i,K}, \ldots, A_{P,1}, A_{P,2}, \ldots, A_{P,K}$][$a_1, \ldots, a_i, \ldots, a_P$]Y=AS wherein Y represents a P-object event in the second video input sequence, A represents said training dictionary, and S represents a sparse matrix of coefficient weights determined by solving an optimization problem.

16. A non-transitory processor-readable medium storing code representing instructions to cause a process for detecting multi-object anomalies in transportation related video footage, said code comprising code to:

receive in an offline training phase a first input video sequence at a first traffic location and identifying at least one normal event involving P moving objects, where P is greater than 1;

assign in said offline training phase said at least one normal event in said first input video sequence to at least one normal event class and building a training dictionary suitable for joint sparse reconstruction;

receive in an online detection phase a second input video sequence captured at a second traffic location similar to said first traffic location and identifying at least one event involving P moving objects;

reconstruct in said online detection phase an approximation of said event within second input video sequence with respect to said training dictionary using a joint sparse reconstruction model; and determine in said online detection phase whether said event within second input video sequence is anomalous by evaluating an outlier rejection measure of said approximation and comparing said measure against a predetermined threshold, wherein said outlier rejection measure is given by $$JSCI(S') = \frac{K \cdot \max_i \|\lambda_i(S')\|_{row,0} / \|S'\|_{row,0} - 1}{K - 1},$$

where $$S' = \begin{bmatrix} \alpha_{1,1} & \alpha_{2,1} \\ \alpha_{1,2} & \alpha_{2,2} \end{bmatrix}$$

and $\alpha_{i,j}$ are coefficient sub-vectors corresponding to coefficient vectors $\alpha_i$, where $i=1, 2, \ldots, P$ represents concatenation of sub-dictionaries from all classes belonging to an i-th trajectory and j represents a given class, K represents a number of normal event classes, $\lambda_i(S')$ represents a characteristic function whose only non-zero entries are the rows in S' that are associated with the i-th class, and row norm $\| \|_{row,0}$ represents the number of non-zero rows of a matrix.

17. The non-transitory processor-readable medium of claim 16 wherein said code further comprises code to determine in said online detection phase whether said event within second input video sequence is anomalous by evaluating an outlier rejection measure of said approximation and comparing said measure against a predetermined threshold.

* * * * *

UNITED STATES PATENT AND TRADEMARK OFFICE
CERTIFICATE OF CORRECTION

PATENT NO. : 9,122,932 B2
APPLICATION NO. : 13/476239
DATED : September 1, 2015
INVENTOR(S) : Raja Bala et al.

It is certified that error appears in the above-identified patent and that said Letters Patent is hereby corrected as shown below:

Title Page:
Insert -- (73) Assignee: The Penn State Research Foundation, University Park, PA. --

Signed and Sealed this
First Day of March, 2016

Michelle K. Lee
*Director of the United States Patent and Trademark Office*